United States Patent
Eberhardt et al.

(10) Patent No.: US 7,096,966 B2
(45) Date of Patent: Aug. 29, 2006

(54) EDGE CUTTER

(75) Inventors: Maximilian Eberhardt, Esslingen (DE); Sven Keller, Remshalden (DE); Georg Becker, Schwaikheim (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 14 days.

(21) Appl. No.: 10/826,357

(22) Filed: Apr. 19, 2004

(65) Prior Publication Data

US 2004/0216904 A1 Nov. 4, 2004

(30) Foreign Application Priority Data

Apr. 19, 2003 (DE) ................. 103 18 324

(51) Int. Cl.
*A01B 33/00* (2006.01)
*A01D 15/00* (2006.01)
*A01D 21/00* (2006.01)
*A01D 23/00* (2006.01)
*A01D 27/00* (2006.01)

(52) U.S. Cl. ............................. 172/15; 172/17; 172/42
(58) Field of Classification Search ............ 172/13–17, 172/42; 30/276, 296.1
See application file for complete search history.

(56) References Cited

U.S. PATENT DOCUMENTS 6,688,404 B1 2/2004 Uhl et al. ..................... 172/15

*Primary Examiner*—Christopher J. Novosad
(74) *Attorney, Agent, or Firm*—Walter Ottesen

(57) ABSTRACT

A portable handheld edge cutter (1) has a cutterhead (2) fixed to a guide tube (4). Two wheels (6, 7) are attached to the cutterhead (2). The cutterhead (2) includes a gear unit mounted in a gear housing (8). A first wheel (7) is rotatably journalled on a first end (27) of the gear housing (8). On the opposite-lying end (28) of the gear housing (8), a cutting knife (9) is mounted and is rotatably driven by the output shaft (18) of the gear unit. In order to achieve a simple assembly of the edge cutter (1) and to protect the gear housing (8) against wear, the second wheel (6) is mounted between the gear housing (8) and the cutting knife (9) and that the two wheels (6, 7) are journalled coaxially to the output shaft (18).

11 Claims, 5 Drawing Sheets

EDGE CUTTER

CROSS REFERENCE TO RELATED APPLICATION

This application claims priority of German patent application no. 103 18 324.8, filed Apr. 19, 2003, the entire content of which is incorporated herein by reference.

FIELD OF THE INVENTION

The invention relates to a portable handheld edge cutter.

BACKGROUND OF THE INVENTION

An edge cutter is known from U.S. Pat. No. 6,688,404 wherein the cutterhead is movable over the ground with a wheel. An additional wheel is attached to the first wheel on the cutterhead with an axial offset. In this way, the edge cutter can be tilted about the two wheels so that the gear housing can lie on the ground. A slide skid is provided on the gear housing in order to avoid wear of the gear housing. This configuration is comparatively complex.

SUMMARY OF THE INVENTION

It is an object of the invention to provide an edge cutter of the above kind which has a simple configuration and wherein wear of the gear housing is avoided.

The portable handheld edge cutter of the invention is for edging a lawn or cutting turf. The portable handheld edge cutter includes: a guide tube; a cutterhead connected to the guide tube; the cutterhead including a gear housing; the gear housing having a first side and a second side lying oppositely to the first side; a first wheel rotatably journalled on the first side of the gear housing; a cutting blade arranged at the second side of the gear housing; the gear housing including a gearing output shaft for rotatably driving the cutting blade; a second wheel disposed between the cutting blade and the gear housing; and, the first and second wheels being rotatably journalled coaxially to the output shaft.

The gear housing is supported between the two wheels. For this reason, it is prevented that the gear housing can stand on the ground. Additional measures for preventing wear are therefore not needed. The arrangement of the cutting knife outside of the two wheels coaxially thereto makes possible the use of the edge cutter also at edges which are not accessible from both sides. Because of the simple configuration of the edge cutter, the weight, which is essential for the handling in portable handheld work apparatus, is considerably reduced.

According to another feature of the invention, a protective hood is formed on the gear housing. The protective hood extends especially approximately perpendicularly to the output shaft and has an angled edge which extends outside of the circular trace diameter of the cutting knife. The protective hood catches pieces thrown up by the cutting knife so that injuries or adverse effects on the operator are avoided. A splash guard is attached to the edge of the protective guard. A simple releasable, reliable attachment of the splash guard to the protective hood can be achieved in that the splash guard is attached to the protective hood with a cotter pin.

A simple configuration of the edge cutter results when the wheels are supported on bearing sleeves formed on the gear housing. The output shaft especially passes through the bearing sleeve of the second wheel. With the bearing sleeves formed on the gear housing, the configuration of the edge cutter can be simplified and the number of individual parts is further reduced. The guide tube is held on the cutterhead in a receptacle formed on the gear housing. In this way, no further individual part is needed for the receptacle of the guide tube. The gear housing is especially configured as two parts. The cutterhead essentially comprises the two gear housing parts on which the wheels and the cutting knife are mounted and in which the gear unit is mounted. In this way, a simple production and assembly of the edge cutter is ensured. It is practical that the cutting knife is driven by an internal combustion engine which is fixed on the end of the guide tube facing away from the cutterhead.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
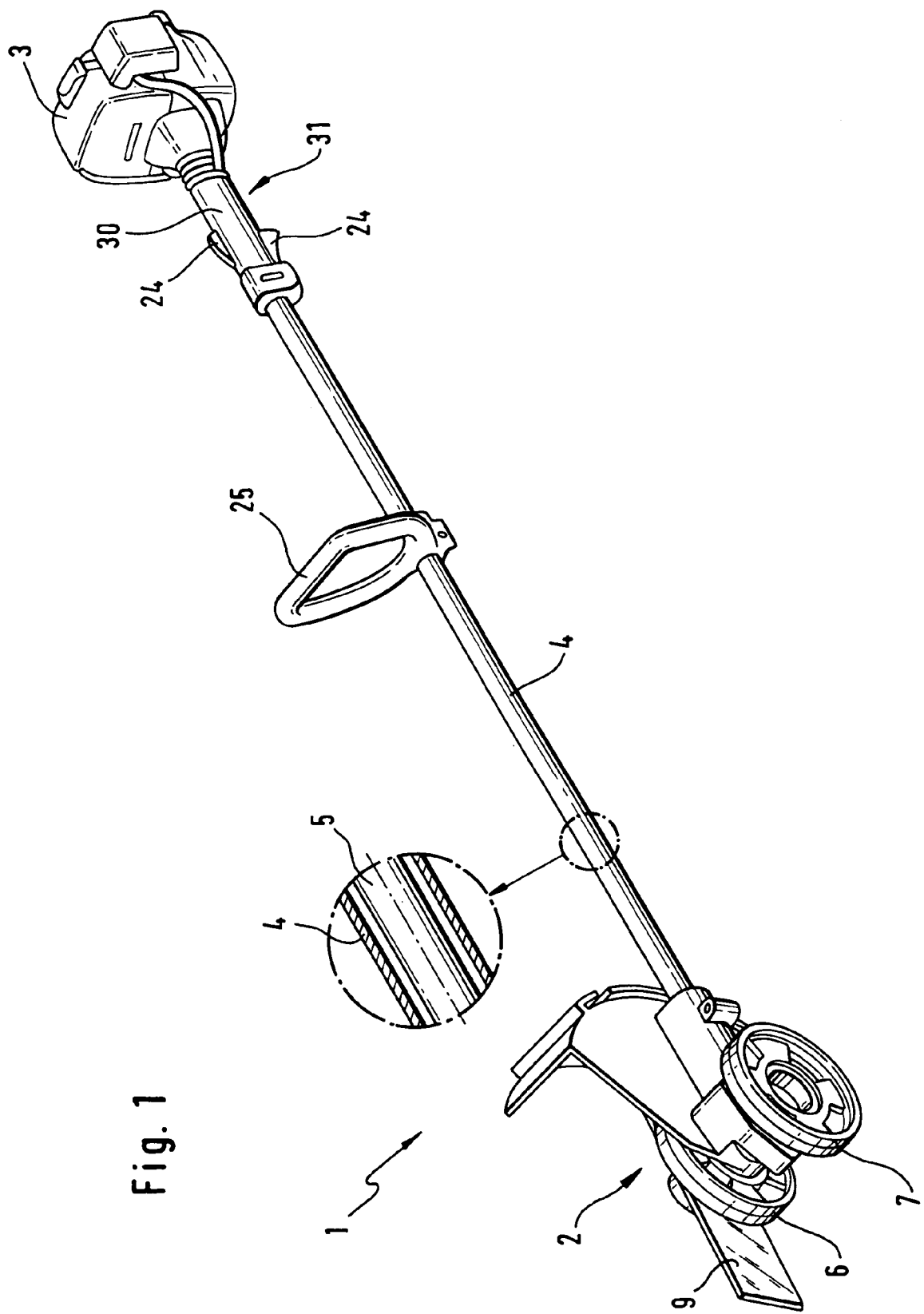
FIG. 1 is a perspective schematic of an improved edge cutter according to an embodiment of the invention.

FIG. 1 shows a portable handheld edge cutter 1 having a cutterhead 2 which is connected to an internal combustion engine 3 via a guide tube 4. The guide tube 4 is configured to be hollow. The drive shaft 5 runs inside the guide tube 4 and transmits the torque from the internal combustion engine 3 to the cutterhead 2. A handle section 31 is formed on the end 30 of the guide tube 4 which faces away from the cutterhead 2 and faces toward the engine 3. Operator-controlled levers 24 are arranged on the handle section 31. A bracket-shaped handle 25 is provided on the guide tube 4. The edge cutter 1 can thereby be guided by the operator at the handle 25 and at the handle section 31. During operation of the edge cutter 1, the wheels 6 and 7, which are attached to the cutterhead 2, run on the ground and the cutting knife 9 is rotatingly driven by the drive shaft 5. The cutting knife 9 is mounted on the cutterhead 2.

Figure 2:
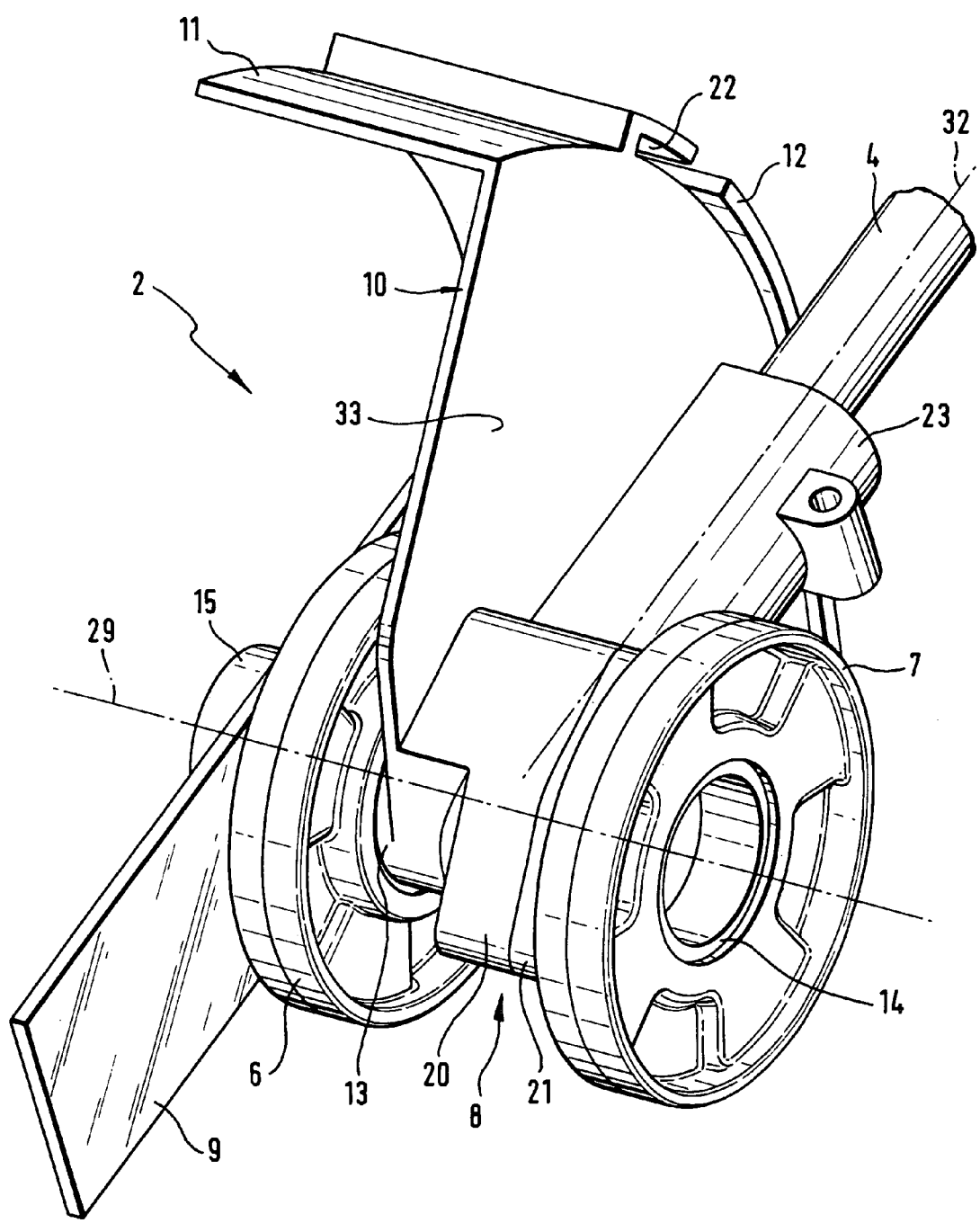
FIGS. 2 to 4 are perspective enlarged schematics of the cutterhead of the edge cutter.

As shown in the enlarged view of FIG. 2, the cutterhead 2 has a gear housing 8 on which a receptacle 23 is formed for the guide tube 4. The receptacle 23 is configured to be approximately tubular-shaped. In the gear housing 8, a gear unit (not shown) is mounted which converts the rotation of the drive shaft 5 about the rotational axis 32 into a rotation of the output shaft of the gear unit about the rotational axis 29. The first wheel 7 is supported on a bearing sleeve 14 on the gear housing 8 on a first end 27 of the gear housing 8 shown in FIG. 4. The bearing sleeve 14 is configured to be one piece with the second gear housing part 21 which forms the gear housing cover. On the end 28 of the gear housing 8 likewise shown in FIG. 4, a second wheel 6 is rotatably journalled by a bearing sleeve 13. The end 28 of the gear housing 8 lies opposite the end 27. As shown in FIG. 2, the bearing sleeve 13 is configured as one piece with a first gear housing part 20 of the gear housing 8. The bearing sleeves 13 and 14 have comparatively large outer diameters so that the friction forces between the hubs of the wheels 6 and 7 and the bearing sleeves (13, 14), respectively, are low. In this way, wear is reduced.

A protective hood 10 is formed on the first gear housing part 20 and this hood extends approximately perpendicular to the rotational axis 29 and therefore also approximately perpendicular to the output shaft 18 (FIG. 3) of the gear unit. An edge 11 is formed on the outer periphery of the protective hood 10. This edge 11 is bent over relative to the base plate 33 of the protective hood and extends approximately parallel to the rotational axis 29. The base plate 33 runs perpendicular to the output shaft 18. The edge 11 extends outside of the circular diameter of the cutting knife 9 so that the cutting knife 9 does not touch the edge 11 during operation. A splash guard 12 can be fixed on the end 11.

Figure 3:
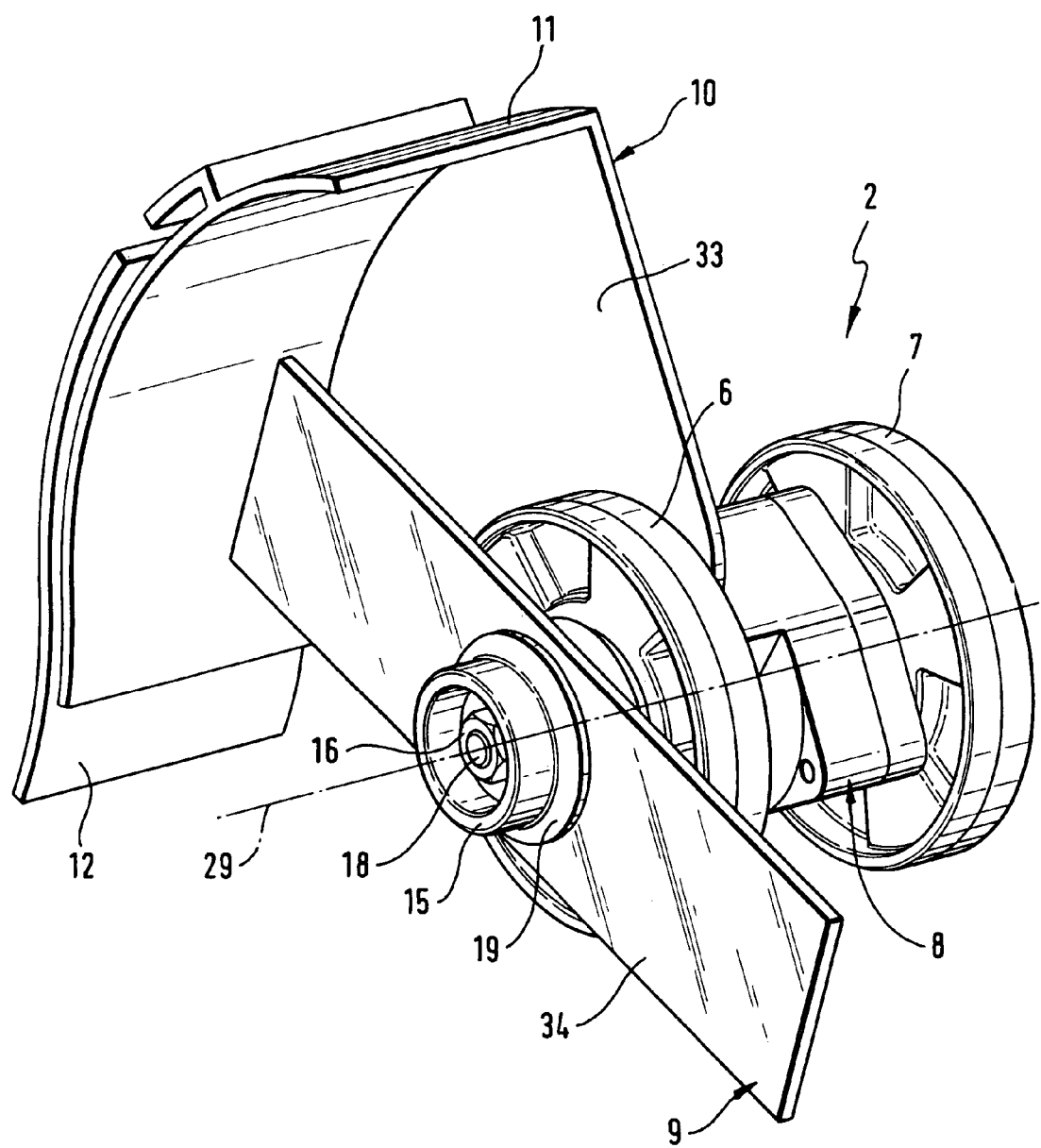

FIG. 3 shows the fixation of the cutting knife 9 on the output shaft 18. A plate 19 is mounted on the outer side 34 of the cutting knife 9. This outer side 34 faces away from the wheel 6 and the gear housing 8 and the plate has an upwardly extending cylindrical edge 15. The plate 19 has a center bore through which the output shaft 18 projects. The cutting knife 9 is fixed on the output shaft 18 via a nut 16. The nut 16 is arranged at the center of the edge 15 and is thereby protected by the edge 15 against damage and dirt or contamination.

Figure 4:
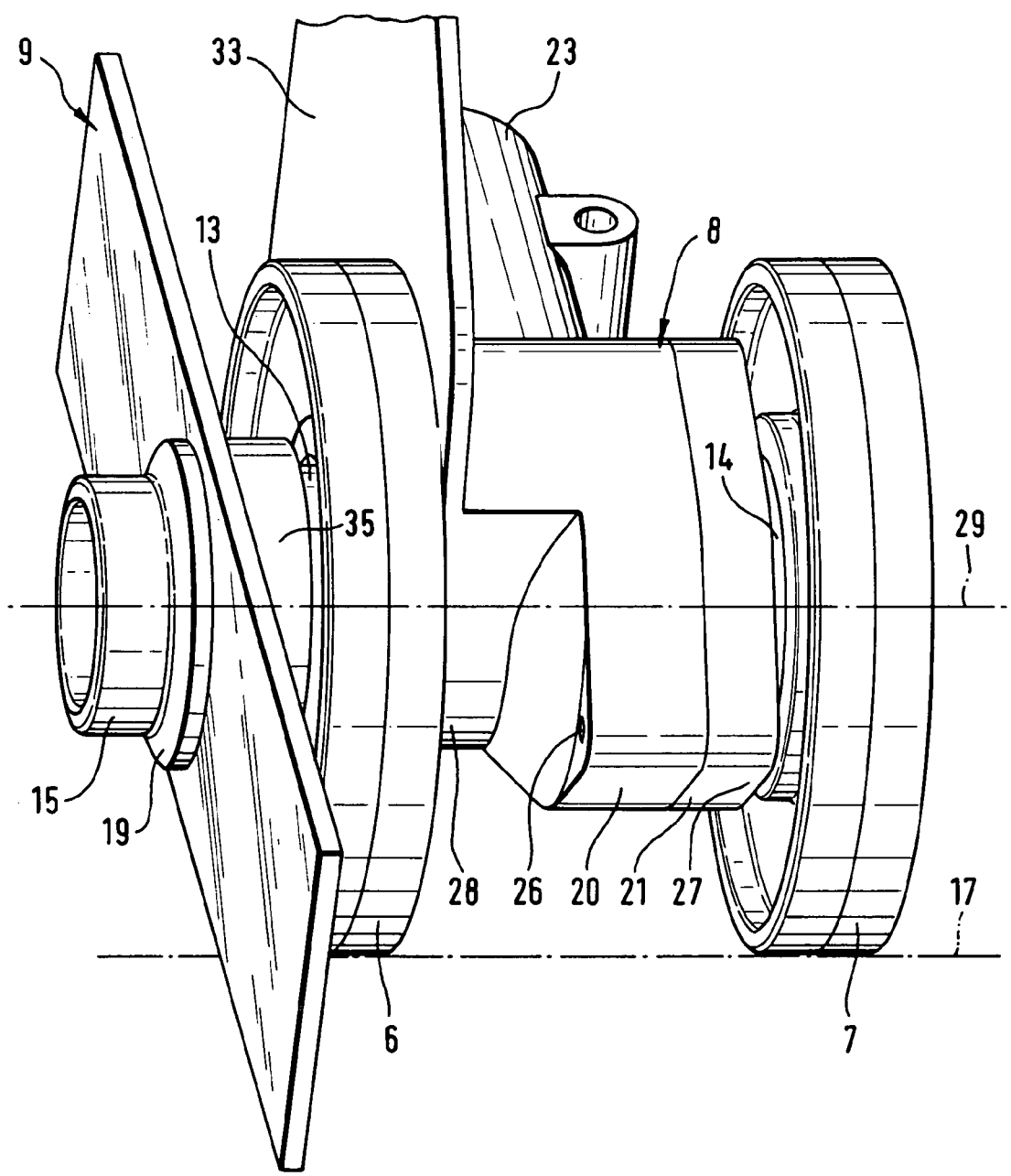

As shown in FIG. 4, the gear housing 8 is formed of two housing parts 20 and 21. The two housing parts are through-connected to each other at the attachment bore 26. The gear housing 8 comprises the first housing part 20 on which the receptacle 23, the base plate 33 of the protective hood 10 and the bearing sleeve 13 for the second wheel 6 are formed. The second gear housing part 21 is configured as one piece with the bearing sleeve 14 for the first wheel 7. The cutting knife 9 is mounted on the side of the second wheel 6 facing away from the gear housing 8. The cutting knife 9 and the two wheels 6 and 7 are mounted coaxially to the rotational axis 29 of the output shaft 18. A spacer sleeve 35 is provided between the second wheel 6 and the cutting knife 9. This spacer sleeve 35 ensures a minimum spacing between the second wheel 6 and the cutting knife 9.

Figure 5:
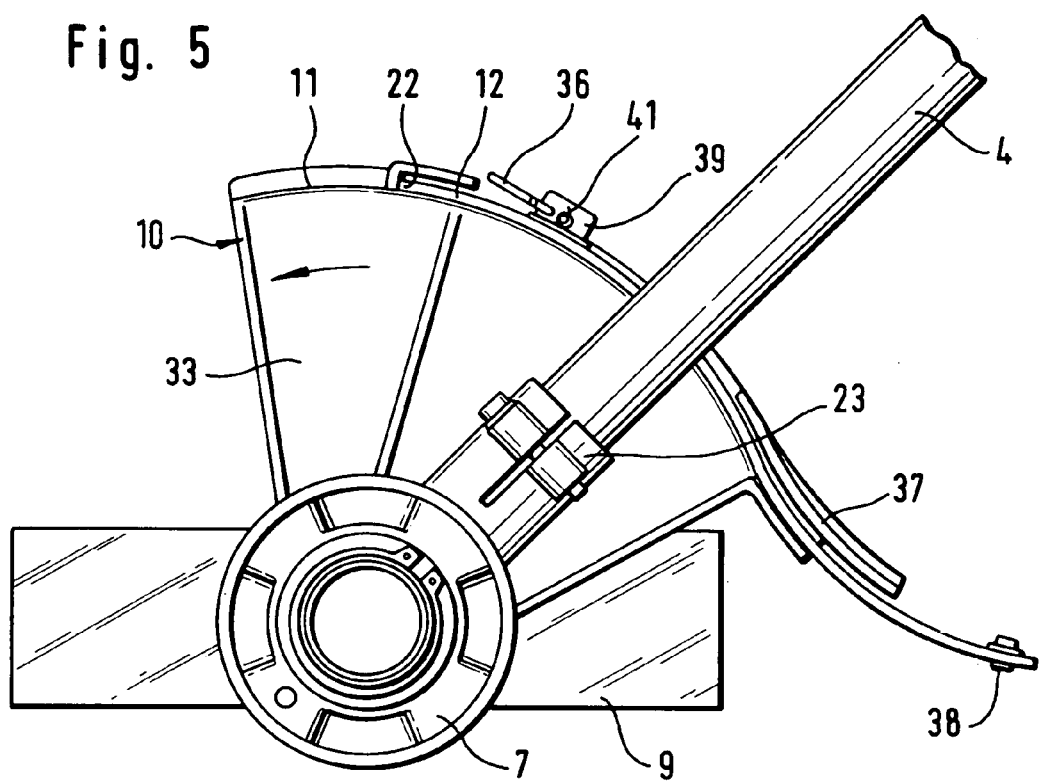
FIG. 5 shows a side elevation view of the cutterhead of the edge cutter.
Figure 6:
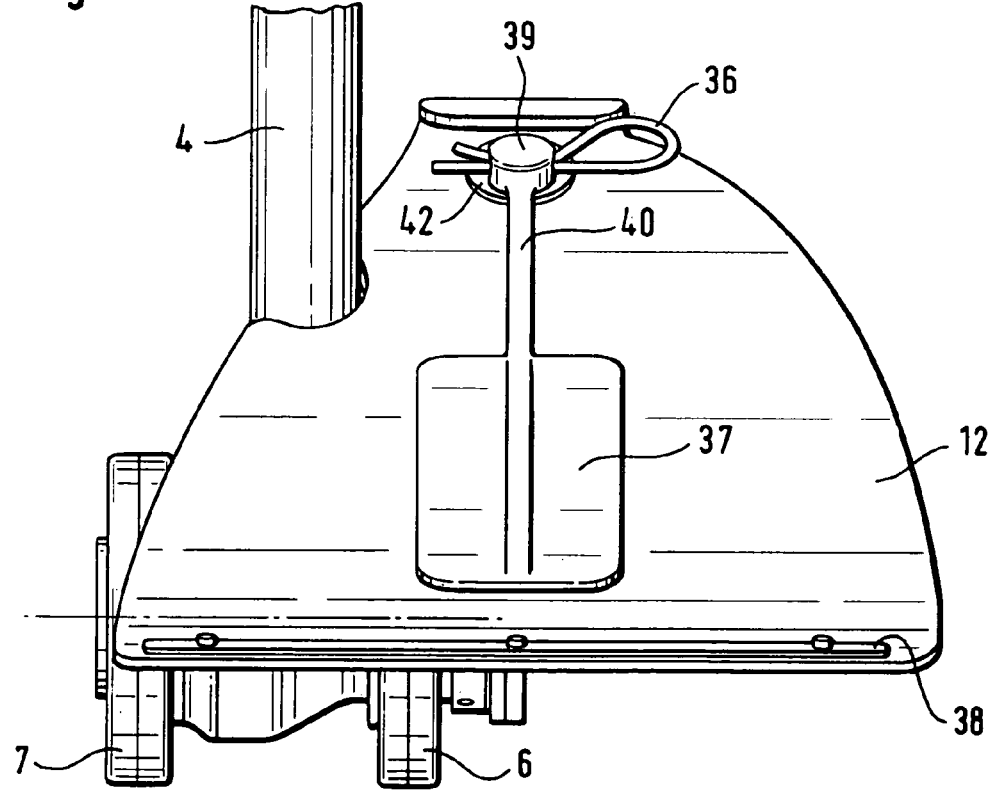
FIG. 6 shows an end elevation view of the cutterhead of the edge cutter.

FIGS. 5 and 6 show the protective hood 10 with the splash guard 12 attached thereto. The splash guard 12 is pushed into the slot 22 and is fixed to the protective hood 10 by a cotter pin 36. The cotter pin 36 projects through a bore 41 in a head 39 of a hold-down device 37. A washer 42 having an enlarged diameter is mounted between the splash guard 12 and the head 39 in order to hold the splash guard 12 reliably at the edge 11 of the protective hood 10. The splash guard 12 is made of a flexible material. The hold-down device 37 ensures that the splash guard 12 lies on the ground and is fixed on the head 39 via a strut 40. On the end lying on the ground, the splash guard 12 has a strip 38. The splash guard 12 widens from the end fixed in the slot 22 to the strip 38 and projects on both sides beyond the protective hood at the end facing toward the ground. With the attachment with the cotter pin 36, the splash guard 12 can be easily separated from the protective hood 10 or be fixed thereto so that an exchange of the splash guard 12 is possible easily and rapidly.

It is understood that the foregoing description is that of the preferred embodiments of the invention and that various changes and modifications may be made thereto without departing from the spirit and scope of the invention as defined in the appended claims.

What is claimed is:

1. A portable handheld edge cutter for edging a lawn or cutting turf, the portable handheld edge cutter comprising:
   a guide tube;
   a cutterhead connected to said guide tube;
   said cutterhead including a gear housing;
   said gear housing having a first side and a second side lying oppositely to said first side;
   a first wheel rotatably journalled on said first side of said gear housing;
   a cutting blade arranged at said second side of said gear housing;
   said gear housing including a gearing output shaft for rotatably driving said cutting blade;
   a second wheel disposed between said cutting blade and said gear housing; and,
   said first and second wheels being rotatably journalled coaxially to said output shaft.

2. The portable handheld edge cutter of claim 1, further comprising a protective hood formed on said gear housing.

3. The portable handheld edge cutter of claim 2, said cutting blade having an outer blade tip defining a circular path as said cutting blade is rotatably driven; said
   protective hood extending approximately perpendicularly to said output shaft; and, said protective hood having a bent-over edge which extends outside of said circular path.

4. The portable handheld edge cutter of claim 3, further comprising a splash guard fixed to said protective hood.

5. The portable handheld edge cutter of claim 4, further comprising a cotter pin for holding said splash guard onto said protective hood.

6. The portable handheld edge cutter of claim 1, further comprising first and second bearing sleeves formed on said gear housing for rotatably journalling said first and second wheels, respectively.

7. The portable handheld edge cutter of claim 6, wherein said gearing output shaft passes through said second bearing sleeve.

8. The portable handheld edge cutter of claim 1, wherein said gear housing has a receptacle formed thereon for receiving said guide tube therein.

9. The portable handheld edge cutter of claim 1, wherein said gear housing is configured to have two housing parts.

10. The portable handheld edge cutter of claim 1, said guide tube having an end facing away from said cutterhead; and, further comprising an internal combustion engine mounted on said end for driving said cutting blade via said gearing output shaft.

11. The portable handheld edge cutter of claim 1, wherein said gear housing has a bottom wall surface facing toward the lawn or cutting turf when said portable handheld edge cutter is in operational use; and, said first and second wheels have an outer diameter selected so as to cause said bottom wall to be at a distance above the lawn or cutting turf to prevent said bottom wall from being subjected to wear from contact therewith during said operational use.

* * * * *